June 18, 1963 C. P. ALBERTSON ETAL 3,093,998
METHOD FOR TESTING FLUIDS FOR PARTICLE CONTAMINATION
Original Filed June 16, 1958     2 Sheets—Sheet 1
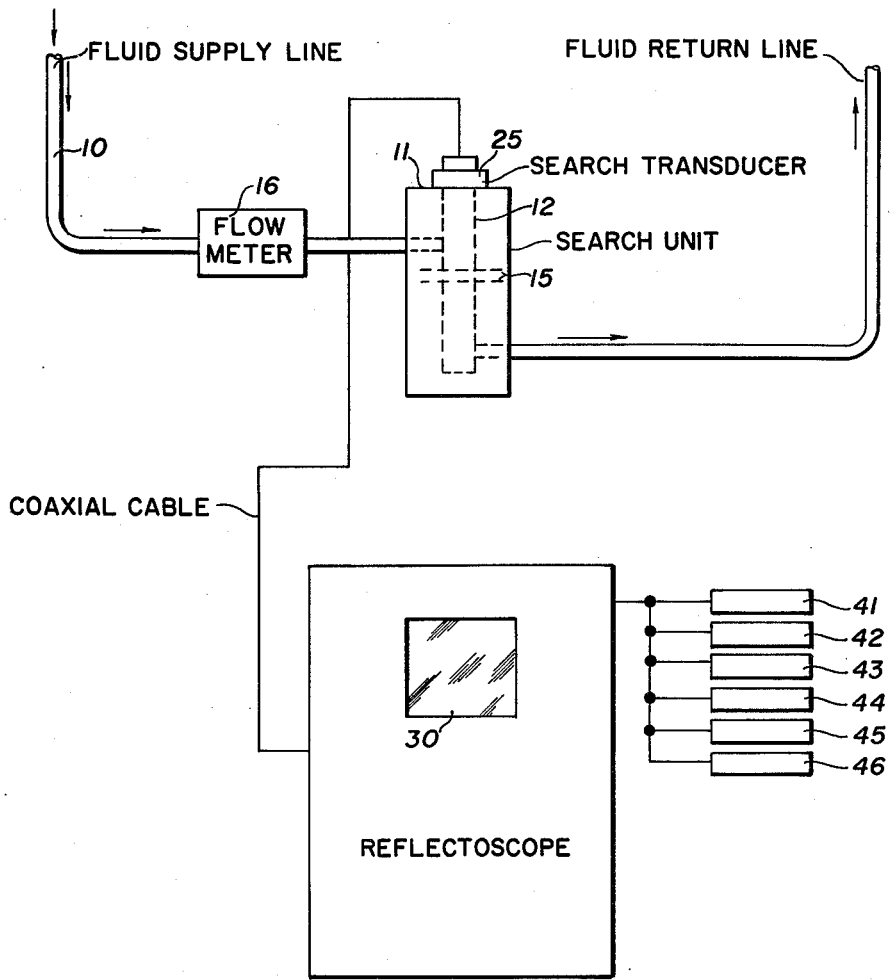
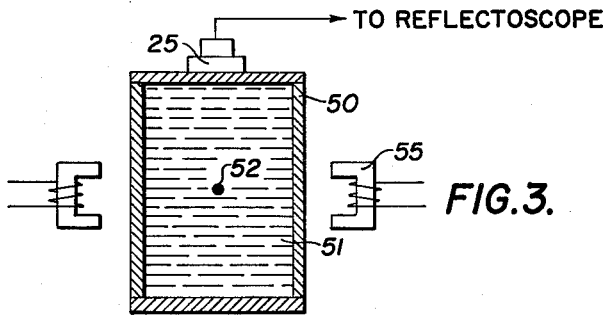
WARREN E. STRITTMATTER,
CHARLES P. ALBERTSON,
INVENTORS.
BY *Robert Hockfield*
ATTORNEY.

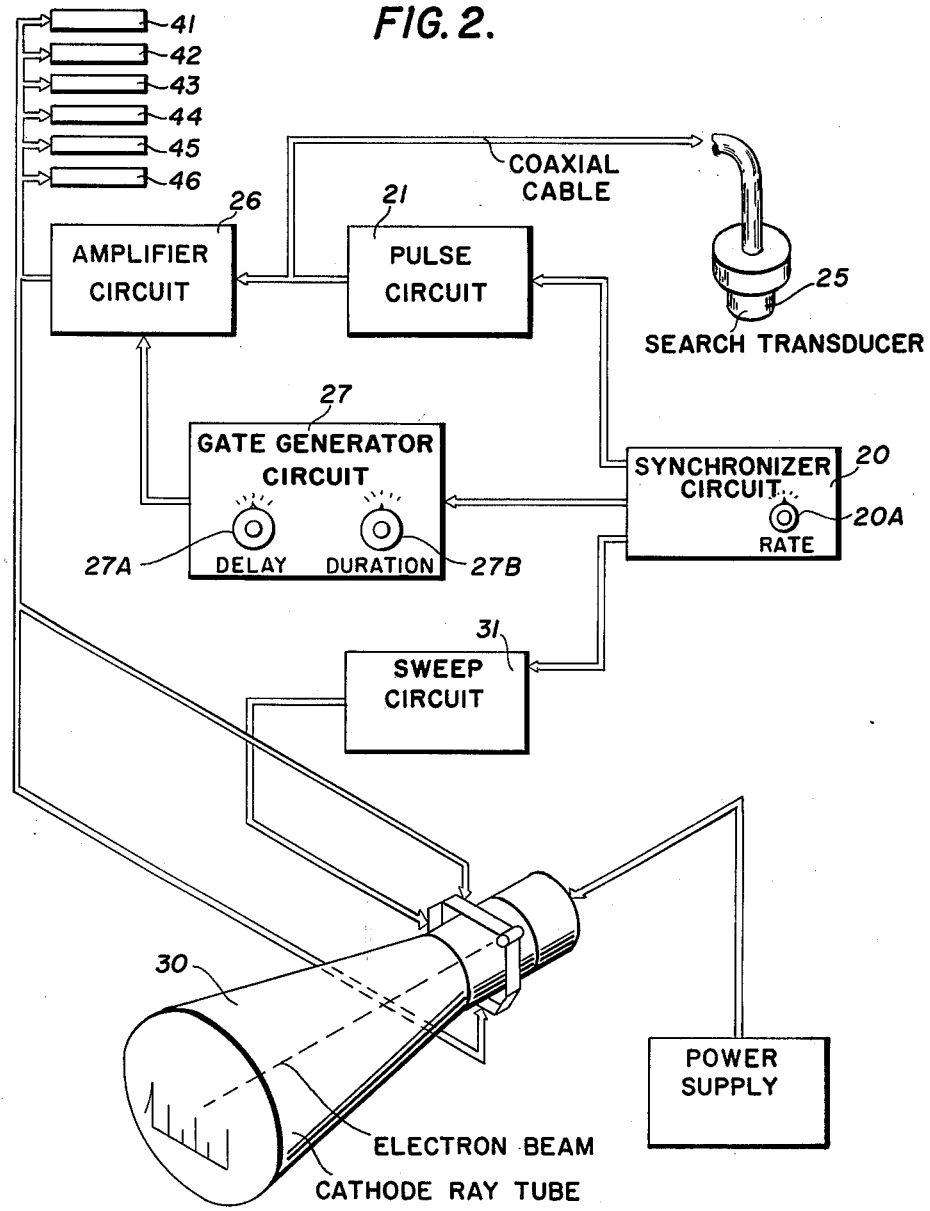

3,093,998
METHOD FOR TESTING FLUIDS FOR PARTICLE CONTAMINATION

Charles P. Albertson, Woodbury, and Warren E. Strittmatter, Plainview, N.Y., assignors to Grumman Aircraft Engineering Corporation, Bethpage, N.Y., a corporation of New York
Continuation of abandoned application Ser. No. 742,276, June 16, 1958. This application Nov. 6, 1959, Ser. No. 851,318
4 Claims. (Cl. 73—61)

This application is a continuation of application Serial No. 742,276 filed June 16, 1958, now abandoned.

The present invention relates to a method for determining the quantity and magnitude of particles in a liquid medium. Such determination is of major importance in many industries, such as the chemical and petroleum fields, and especially in those applications where hydraulic fluids are employed in the operation of complex hydraulically operated equipment. The hydraulic controls of various aircraft mechanisms, for example, depend for their proper functioning upon the cleanliness of the hydraulic fluids in view of the extremely close machine fits and finishes which are used in modern high performance hydraulic devices. For this purpose highly efficient filtration devices are required to insure such fluid cleanliness, and it is necessary to devise methods and means to determine the efficiency of such elements. This is done by determining the number and sizes of particles remaining after filtration. Most of the methods heretofore employed have been laborious, time-consuming to the extent of requiring several hours for a determination, and subject to many sources of error.

It is therefore one of the principal objects of this invention to provide a method of testing fluids for particle contamination which will give rapid, repeatable and precise information as to the number and sizes of the particles within any liquid.

It is a further object of the invention to provide such a method which will be capable of giving this information continuously while a liquid is flowing in a system.

It is another object of this invention to provide a method of particle determination by ultrasonic means.

Further objects and advantages of this invention will become apparent in the following detailed description thereof.

In the accompanying drawings,

FIG. 1 is an assembly view, largely diagrammatic, of a system embodying one form of our invention;

FIG. 2 is a diagrammatic assembly view of the ultrasonic system employed in the FIG. 1 form; and FIG. 3 is a vertical section through a reference capsule.

Referring to FIG. 1 of the drawings, the invention is illustrated as applied to the fluid flowing in a closed system but it will be apparent from the following description that it has more general application. As shown, fluid is supplied by a supply line 10 to a test cylinder 11 having a bore 12 therein. The fluid enters one end of the bore and leaves by the other end. The supply line may, for example, be a by-pass for a relatively small quantity of fluid, the main body of which is flowing through a relatively large pipe.

Within the bore 12 provision is made for determining the presence of particles of predetermined sizes in the fluid as it flows through a test zone or testing position 15 indicated by horizontal dotted lines. For this purpose there is employed the ultrasonic arrangement disclosed in FIG. 2 in which a synchronizer circuit 20 periodically energizes a pulse generating circuit 21 to generate high frequency electrical pulses which are applied to a piezoelectric transducer 25 which transforms the electrical pulses into mechanical pulses of ultrasonic frequency. The transducer 25 is positioned at one end of bore 12 to transmit the ultrasonic mechanical pulses into the fluid flowing therein. The pulse which encounters a particle will be reflected back to the piezoelectric element and transformed into electrical signal voltages. Such voltages, after being amplified by a suitable amplifier circuit 26 may be caused to deflect the sweep of a cathode ray tube 30, the sweep being generated by a sweep circuit 31 energized by the synchronizer 20 simultaneously with the generation of the pulse. The electronic devices used are all well known in the art and are commercially available in an organization of elements commonly referred to as an "Ultrasonic Reflectoscope" embodying the principles of operation disclosed in Patent No. 2,280,226.

As shown on the face of the tube 30, the two end lines are indications of the wave from the face of the transducer 25 and the reflection from the bottom of the bore 12, while the intermediate lines of different height are indications of the reflected wave from various size particles contained within the fluid in the bore 12. It should be apparent that the position of the lines along the sweep is a function of the distance from the transducer 25 to the particles, while the height of those lines or indications, being a function of voltage, is a function of the particle area, usually defined in terms of its diameter in microns.

Since information is desired only from the test zone 15, suitable means may be provided for rendering the amplifier effective to receive voltages generated by the waves reflected only from particles within that zone. For example, amplifier 26 may be of a known type which is normally ineffective to translate applied signals, but can be operatively conditioned by a control pulse supplied by a gate generator circuit 27. The gate generator 27 is synchronized with synchronizer circuit 20 and the time of occurrence and duration of each gate pulse may be adjusted by means of a delay control 27A and a duration control 27B, respectively. Circuits 20, 26 and 27 may be of any conventional type or of the particular forms disclosed in Patent No. 2,507,854 for providing indications of reflections from within a selected zone of the bore 12.

The rate of pulse generation relative to the rate of flow of the fluid through the test zone 15 is adjusted by means of rate control 20A of synchronizer circuit 20 so as to preclude the possibility of multiple reflections from the same particle. In other words, the rate of pulse generation relative to the rate of flow of fluid through the test zone 15, as measured by a flow meter 16 in supply line 10, is such that any one particle will be subjected to and hence will reflect only one pulse as that particle passes through the test zone 15.

More specifically, the electrical pulses which are applied to the transducer 25 are transformed thereby to mechanical pulses which upon encountering a particle are reflected back to the transducer 25 and transformed to an electrical voltage. After amplification, this voltage is fed to the cathode ray tube 30 to indicate on the face thereof the relative position and size of the particle. To preclude erroneous indications on the face of the tube 30 the electrical pulses which are applied to the transducer 25 must be of such frequency that a particle passing from the upper limit of the zone 15 to the lower limit thereof, as the fluid flows through the bore 12, will be subjected to only one pulse. For example, if the velocity of flow of the fluid through the test zone 15 by 100 inches per second and the test zone be $\frac{1}{10}$ of an inch in depth, then any one particle contained in the fluid will pass through the test zone in 1/1000 of a second. The pulses applied to the transducer 25 by the pulse generating circuit 21 in such instance should be of a frequency of 1000 pulses per second. If of a greater frequency, more than one pulse would be reflected from the particle in passing through the test zone, or if of a lesser frequency, the particle could pass through the test zone without being subjected to even one pulse. It follows, therefore, that if the flow rate were doubled, the rate of pulse generation must also be doubled, and hence, the flow rate and the rate of pulse generation are directly proportional.

Assuming a uniform or the same degree of fluid contamination, a greater flow rate and hence a greater rate of pulse generation will result in more reflected waves from the particles per unit of time and hence more lines or indications per unit of time on the face of the cathode ray tube 30, as well as a greater count per unit of time indicated by a group of pulse counters or totalizers 41–46 supplied with the output of amplifier 26. The counters 41–46 are of a type which is commercially available, and may comprise those units known as Eput Meter Model 5210 manufactured by the Berkeley Division of Beckman Instrument Company, or may be of the type disclosed in an article entitled "Electronic Instrumentation of a Device to Automatically Count and Size Particles in a Gas" by E. S. Gordon, D. C. Maxwell and N. E. Alexander published in the I. R. E. Transactions on Industrial Electronics of March 1956. Since the amplifier 26 translates received pulses during the interval of each gate pulse from gate circuit 27 and is otherwise disabled, the counters are effective for counting only during such intervals. As explained in the aforementioned Patent No. 2,507,854, by appropriately selecting the time of occurrence and duration of these intervals, only particles in zone 15 (FIG. 1) are counted.

The cathode ray tube type of indication is satisfactory for relatively slow rates of fluid flow past the testing area, but more rapid rates require a faster indication which would not be retained by the eye viewing a cathode ray tube and which may be too rapid even for a camera. In such cases the series of electronic counters 41–46 of progressively increasing sensitivity are employed, the counters being actuated by the output voltages of the amplifier 26. Since the output voltages are proportional to the particle size, each counter is adjusted to a different voltage or amplitude range; for example, 0–5, 5–10, 10–15, etc., micron sizes, may be employed.

In operation, controls 20A, 27A and 27B are adjusted in accordance with the explanation given hereinbefore, and the counters 41–46 are set to zero. Fluid is then permitted to flow through sample search unit 11 and the fluid therein is subjected to ultrasonic pulses from transducer 25. Reflections of pulses from within the cell are converted to electrical pulses by the transducer and these are supplied to amplifier 26. By reason of the particular adjustments of the controls, amplifier 26 is operatively conditioned during the occurrence of pulses from zone 15 and thus only the pulses from this zone are fed to counters 41–46 which register or totalize the pulses in their respective amplitude ranges. After a given interval of time, readings are taken and the system is disabled. The totals registered on the counters then represent the number of particles in each of the size ranges corresponding to the amplitude ranges. Prior to the beginning of another counting cycle, the counters 41–46 are, of course, reset to zero.

In order to give an absolute indication of particle size the indications obtained by the device hereinbefore described may be measured in terms of a reference output obtained from a known size particle. Such a reference output can be obtained initially by the use of a reference capsule 50 which contains a liquid medium 51, which may be a hydraulic fluid of suitable viscosity to prevent rapid movement of a particle 52 of known dimension and material disposed within the liquid. Preferably the particle is maintained in free suspension within the liquid medium as by means of a rotating magnetic field supplied by a plurality of pairs of magnets 55 surrounding the capsule and acting upon a magnetic particle 52 which may be carbonyl.

The pair of magnets 55 are alternatively energized to create electromagnetic forces which counteract the force of gravity acting upon the pellet 52 to maintain the pellet in equilibrium within the viscous medium 51. They are spaced 180° apart and are rotated as a unit about the vertical axis of the capsule 50. Because the electromagnets are rotating and the electromagnetic field is rotating therewith, and because the electromagnets are alternatively energized there is no constant pull on the pellet in any one radial direction. Thus, the pellet 52 will not be pulled from the center of rotation but will maintain its position at the center.

The crystal transducer, which may be the crystal 25, is applied to one end of the capsule in the same manner as it is applied to the search unit 11 and the periodic pulses are transmitted into the capsule. The reflected pulses are received and amplified in the reflectoscope. The output from the reflectoscope will operate the respective counter which is gated for that particular span of signal voltage. A plurality of reference capsules each with a known size particle 52 may thus be employed to give a range of calibrations.

Obviously, for calibration or for testing, the rate of pulse generation may be a multiple or even a fraction of that rate which results in the reflection of only one pulse from a particle as it passes through the test zone 15. In such instance, this factor is taken into consideration in interpreting the indications appearing on the face of the cathode ray tube 30 and the data obtained from the counters 41–46.

While a particular embodiment of the present invention has been shown and described, it is apparent that changes or modifications may be made without departing from this invention in its broader aspects and, therefore, the aim in the appended claims is to cover all such changes and modifications as fall within the true spirit and scope of this invention.

Having described our invention, what we claim and desire to secure by Letters Patent is:

1. A method of determining the number and sizes of contaminant particles in a fluid which comprises the steps of: causing said fluid to flow past a testing position; measuring the rate of fluid flow past said testing position; subjecting said position and its fluid to the action of ultrasonic pulses; adjusting the rate of pulse generation relative to the rate of flow such that any one particle will be subjected to a predetermined number of pulses as that particle passes said testing position; and indicating the number and magnitude of the reflections of said pulses returned from the fluid in testing position.

2. A method of determining the number and sizes of contaminant particles in a fluid, which comprises the steps of: causing said fluid to flow past a testing position; measuring the rate of fluid flow past said testing position; subjecting said position and its fluid to the action of ultrasonic pules at a rate of repetition selected relative to the rate of flow such that any one particle in the testing position will be subjected to a predetermined number of pulses as that particle passes through the testing position; and indicating the number and magnitude of the reflections of said pulses returned from the fluid in testing position.

3. A method of determining the number and sizes of contaminant particles in a fluid, which comprises the steps of: causing said fluid to flow past a testing position; measuring the rate of fluid flow past said testing position; subjecting said position and its fluid to the action of ultrasonic pulses; adjusting the rate of pulse generation relative to the rate of flow such that any one particle in the testing position will be subjected to a predetermined number of pulses as that particle passes through the testing position; and obtaining indications of the number of ultrasonic pulses reflected from said testing position in each of a plurality of amplitude ranges of progressively increasing magnitude.

4. A method of determining the number and sizes of contaminant particles in a fluid, which comprises the steps of: causing said fluid to flow past a testing position; measuring the rate of fluid flow past said testing position; subjecting said position and its fluid to the action of ultrasonic pulses propagating in a direction common to that of fluid flow; adjusting the rate of pulse generation relative to the rate of flow such that any one particle in the testing position will be subjected to a predetermined number of pulses as that particle passes through the testing position; and indicating the number and magnitude of the reflections of said pulses returned from the fluid in testing position.

References Cited in the file of this patent
UNITED STATES PATENTS

| | | |
|---|---|---|
| 2,618,968 | McConnell | Nov. 25, 1952 |
| 2,682,766 | Van Valkenburg | July 6, 1954 |
| 2,693,105 | Straehl et al. | Nov. 2, 1954 |
| 2,757,354 | Bolzmann | July 31, 1956 |
| 2,775,748 | Rod et al. | Dec. 25, 1956 |